United States Patent
Alasti (10) Patent No.: US 12,508,520 B1
(45) Date of Patent: Dec. 30, 2025

(54) SHORT PATH FRACTIONAL DISTILLATION APPARATUS

(71) Applicant: Artisan Industries Inc., Stoughton, MA (US)

(72) Inventor: Perry Alasti, Westwood, MA (US)

(73) Assignee: Artisan Industries Inc., Stoughton, MA (US)

( * ) Notice: Subject to any disclaimer, the term of this patent is extended or adjusted under 35 U.S.C. 154(b) by 192 days.

(21) Appl. No.: 18/487,798

(22) Filed: Oct. 16, 2023

Related U.S. Application Data (60) Provisional application No. 63/381,919, filed on Nov. 1, 2022.

(51) Int. Cl.
| | |
|---|---|
| *B01D 3/28* | (2006.01) |
| *B01D 1/08* | (2006.01) |
| *B01D 3/06* | (2006.01) |
| *B01D 3/14* | (2006.01) |
| *B01D 3/32* | (2006.01) |
| *B01D 5/00* | (2006.01) |

(52) U.S. Cl.
 CPC .............. *B01D 3/28* (2013.01); *B01D 1/08* (2013.01); *B01D 3/06* (2013.01); *B01D 3/143* (2013.01); *B01D 3/32* (2013.01); *B01D 5/006* (2013.01)

(58) Field of Classification Search
 CPC . B01D 1/08; B01D 3/06; B01D 3/143; B01D 3/28; B01D 3/32; B01D 5/006
 See application file for complete search history.

(56) References Cited

U.S. PATENT DOCUMENTS

| | | | | |
|---|---|---|---|---|
| 2,993,842 | A * | 7/1961 | Smith | B01D 3/30 202/205 |
| 3,239,547 | A * | 3/1966 | Brion | C11B 3/14 554/185 |
| 3,393,133 | A | 7/1968 | Baird | |
| 3,620,283 | A * | 11/1971 | Brown | B01D 1/22 159/13.2 |
| 4,036,865 | A * | 7/1977 | Hartmann | C11B 3/14 203/79 |
| 6,953,499 | B2 * | 10/2005 | Kellens | C11B 3/12 96/197 |
| 7,597,783 | B2 * | 10/2009 | Kruidenberg | B01D 5/003 202/205 |
| 7,670,634 | B2 * | 3/2010 | Kellens | B01D 3/346 426/492 |
| 8,101,784 | B2 * | 1/2012 | Albers | B01D 3/12 554/8 |
| 10,493,374 | B2 * | 12/2019 | Wells | B01D 5/0003 |
| 10,946,303 | B2 * | 3/2021 | Kremerman | B01D 5/0063 |
| 11,447,718 | B2 * | 9/2022 | Alasti | A23D 9/02 |
| 2011/0100561 | A1 * | 5/2011 | Alasti | B01D 1/222 159/49 |
| 2018/0161693 | A1 * | 6/2018 | Kremerman | B01D 5/009 |

(Continued)

*Primary Examiner* — Jonathan Miller
(74) *Attorney, Agent, or Firm* — George Jakobsche Patent Counsel PLLC (57) ABSTRACT

A short path fractional distillation apparatus includes a flash distillation apparatus disposed above, and directly connected to, a short path stripper, without intervening piping. This combination facilitates fractionally distilling liquids, including heat-sensitive liquids, such as edible oils, to remove contaminants into individual streams, with low loss, short residence times, and no moving parts. Embodiments provide three distinct output streams.

5 Claims, 2 Drawing Sheets

(56) References Cited

U.S. PATENT DOCUMENTS

2019/0060780 A1* 2/2019 Maibach .................. B01D 3/02
2019/0076752 A1* 3/2019 Maibach .............. B01D 5/0003
2020/0377819 A1* 12/2020 Alasti ....................... C11C 1/10
2021/0001244 A1* 1/2021 Kremerman ............. B01D 3/32

* cited by examiner

SHORT PATH FRACTIONAL DISTILLATION APPARATUS

CROSS REFERENCE TO RELATED APPLICATIONS

This application claims a benefit of U.S. Provisional Patent Application No. 63/381,919, filed 2022 Nov. 1, titled "Short Path Fractional Distillation Apparatus," the entire contents of which are hereby incorporated by reference herein, for all purposes.

BACKGROUND

Technical Field

The present invention relates to separation and purification of high boiling, heat-unstable materials in specialty chemical, petrochemical, food, and edible oil industries, and more specifically to thermal removal of relatively volatile undesirable compounds from high boiling products by short path fractional distillation.

Related Art

Crude oils, i.e., unrefined edible oils, such as soybean, coconut, rice, and palm oil, typically contain free fatty acids (FFAs), phosphatides, soaps, color compounds and other environmental contaminants. These oils are not suitable for human consumption until the FFAs and other contaminants are removed to produce bland oil with acceptable color, odor, and taste. Typically, four processing steps are employed to refine edible oil: degumming, neutralization, bleaching, and deodorization.

However, some contaminants can be created while processing edible oils. For example, fatty acid esters of 3-chloro-1, 2-propanediol (3-MCPD), and glycidyl esters (GEs) are heat-induced contaminants that are not typically present in virgin oil. Instead, these contaminants are formed during high temperature deodorization.

Other contaminants, such as mineral oil saturated hydrocarbons (MOSH) and mineral oil aromatic hydrocarbons (MOAH), commonly referred to as polyaromatic hydrocarbons (PAH), are neither present in virgin oil nor generated during deodorization. These mineral oils generally consist of short chain C10-16, to as high C10-55 or higher, saturated hydrocarbons MOSH/POSH, and C10-16, to as high as C10-50 or higher, MOAH. These hydrocarbons are present in so-called "food grade lubricants" (hydraulic lubricating fluids) used in food refining processes and equipment. However, it is currently impossible to produce mineral oil-based lubricants free of both MOSH and MOAH. Therefore, these hydrocarbons can be present in any edible oil, since all oils, whether chemically or physically refined, are subjected to processing equipment, such as pumps, agitators, dryers, and evaporators, that uses hydraulic fluid for lubrication.

Conventional short path evaporation (sometimes referred to as molecular distillation) is often used to remove unwanted contaminants from edible oils, pharmaceuticals, natural extracts, viscous waxes, and other products. Conventional short path evaporation involves high vacuum, wiped film rotor technology, and an internal condenser. The condenser is generally disposed inside, and typically within close proximity of, one or more heated surfaces to prevent pressure drop, while condensing vapors generated by the heated surfaces. This arrangement enables equipment to operate in a micron range of vacuum to reduce operating temperatures and, therefore, allows processing many heat-sensitive, high boiling, and difficult to distill products. However, a short path evaporator (SPE) is essentially an evaporator, with an internal condenser. A short path evaporator is typically used to maximize the recovery of high boiling, heat sensitive materials at reduced operating pressures. Typically, short path evaporators are used to distill whole portions of products, such as vitamin E. However, in applications involving purifying high boiling products by stripping only a few fractions of a percent, and more typically a few parts per million (ppm) of low boiling contaminants, the result is generally a significant loss of the product. In addition, short path evaporators have high-speed rotors within a few millimeters of internal heated surfaces to maintain an agitated thin film of product, an important feature of these types of evaporators. However, due to the complexity and the number of moving parts, they are costly and time consuming to maintain. They consume electricity to operate the agitators/rotors and require lubricants for mechanical seals and bearings. As noted, such lubricants, if leaked into the process, are believed to be the main source of contamination of food products.

Thus, there is a need for distillation apparatus that can remove these and other contaminants, while preserving heat-sensitive products and incurring low losses, without moving parts.

SUMMARY OF EMBODIMENTS

An embodiment of the present invention provides short path fractional distillation apparatus. The short path fractional distillation apparatus includes flash distillation apparatus and a short path stripper disposed directly below the flash distillation apparatus.

The flash distillation apparatus defines a fractionation volume. The flash distillation apparatus includes an evacuation port, a first input port, a condenser, and a first output port. The evacuation port is in fluid communication with the fractionation volume. The first input port is configured to introduce a pre-heated liquid into the fractionation volume and cause vaporization of at least a relatively low boiling point portion of the introduced pre-heated liquid. The condenser is disposed within the fractionation volume and configured to cool at least a portion of the fractionation volume and thereby condense a vaporized relatively low boiling point portion of the introduced pre-heated liquid to produce a first condensate.

The first condensate port is distinct from the evacuation port. The first condensate port is configured to withdraw the first condensate. The first output port is distinct from the first condensate port and distinct from the evacuation port. The first output port is disposed at a bottom of, and in fluid communication with, the fractionation volume. The first output port is configured to allow a liquid portion of the introduced pre-heated liquid to flow under gravity therethrough.

The short path stripper includes an elongated housing, a plurality of vertically spaced apart plates, a plurality of jackets, a cooling member, a heating member, a second output port, and a second condensate port.

The elongated housing has a vertical axis. The elongated housing also has a second input port at a top of the short path stripper. The second input port is directly fluidically coupled to the first output port of the flash distillation apparatus, without intermediate piping, such that liquid from the fractionation volume flows under gravity, through the first output port, into the second input port.

The plurality of vertically spaced apart plates is disposed within the housing along the vertical axis. Each plate has an outer dimension. Each plate is oriented perpendicular to the vertical axis. Each plate defines a respective aperture therethrough. The aperture has a respective dimension.

The plurality of jackets is interdigitated along the vertical axis with the plurality of plates. Each jacket includes a tube and an inwardly and downwardly dished flange about an upper circumference of the tube. Each jacket is disposed below, and vertically spaced apart from, a respective above-adjacent plate of the plurality of plates. Each jacket defines an inner wall surface having an inside dimension less than the outer dimension of the above-adjacent plate and greater than the dimension of the aperture of any below-adjacent plate.

The cooling member extends axially through the tubes of the plurality of jackets. The cooling member has an outer wall parallel to, and spaced a predetermined distance apart from, the inner wall surface of each jacket of the plurality of jackets.

The heating member is thermally coupled to the inner wall surface of each jacket of the plurality of jackets.

The second output port is distinct from the first output port and is distinct from the first condensate port. The second output port is configured to withdraw a liquid residue from a bottom of the elongated housing.

The second condensate port is distinct from the first condensate port and the second output port. The second condensate port is configured to withdraw second condensate created by the cooling member.

Optionally, in any embodiment, the condenser includes a cooling surface, a first cooling fluid input port, a first cooling fluid output port, and a first cooling fluid circuit that extends from the first cooling fluid input port to the first cooling fluid output port. The first cooling fluid circuit is in thermal contact with the cooling surface. The condenser also includes a cap having an outer periphery and is disposed below the cooling surface and above the first output port. The condenser also includes a gutter disposed below the cap. The gutter is in fluid communication with the first condensate port. The gutter defines an aperture having an inner periphery such that, in a vertical projection, all of the outer periphery of the cap lies outside the inner periphery of the gutter.

Optionally, in any embodiment, the cooling member includes a second cooling fluid input port, a second cooling fluid output port, and a second cooling fluid circuit that extends from the second cooling fluid input port to the second cooling fluid output port. The second cooling fluid circuit is in thermal contact with the outer wall.

Optionally, in any embodiment, the heating member includes a heating fluid input port, a heating fluid output port, and a heating fluid circuit that extends from the heating fluid input port to the heating fluid output port. The heating fluid circuit is in thermal contact with the inner wall surface of each jacket of the plurality of jackets.

Optionally, in any embodiment, a distance between a bottom of the flash distillation apparatus and a top of the short path stripper is less than about 6 inches (15.24 cm).

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments of the present invention provide systems and methods for fractionally distilling liquids, including heat-sensitive materials, such as edible oils, to remove contaminants or other light fractions based on their volatility, or differences in their vapor pressures relative to the heavy product fractions into individual streams, under deep vacuum, with minimal loss of oil, short residence times, and no moving parts. An exemplary embodiment accepts an input stream and provides three distinct output streams. The embodiment includes flash distillation apparatus directly connected to short path distillation apparatus, such as a short path stripper.

A vessel of the flash distillation apparatus defines a fractionation volume, with a condenser disposed within the fractionation volume. The flash distillation apparatus also includes a first condensate port (for the first output stream) and an output port. The short path stripper includes an input port directly coupled to the output port of the flash distillation apparatus. The short path stripper also includes a second condensate port (for the second output stream) and an output port (for the third output stream). The third stream typically contains a heavy fraction, which could be a product stream or a waste stream, depending on whether the heavy fraction is considered a desirable or an undesirable component.

In operation, a pre-heated liquid is introduced into the fractionation volume, causing a first portion of the liquid to vaporize. The vapor condenses on a cold surface of the condenser and exits via the first condensate port, thereby providing a first output stream. The rest of the pre-heated liquid, now generally free of material of the first output stream, remains liquid and flows through the output port of the flash distillation apparatus, directly into the short path stripper. Removing the material of the first output stream in the flash distillation apparatus, prior to the liquid entering the short path stripper, reduces the load on the short path stripper.

The short path stripper evaporates and condenses a second portion of the liquid. The second portion exits the short path stripper via the second condensate port, thereby providing the second output stream. Remaining liquid exits the short path stripper via its output port, thereby providing the third output stream. The first, second, and/or third output streams are purified streams and may be respective waste and/or product streams, depending on composition of the input stream and operating parameters.

As known in the art, one advantage of short path distillation apparatus is the short distance between an evaporation surface and a condensing surface, which is ideally less than one mean free path (MFP). Mean free path is defined as the average distance a molecule travels in the vapor phase before colliding with another molecule. Because such collisions can degrade certain heat-sensitive materials, such as tocopherols and other similar high boiling, heat-sensitive products, minimizing such collisions by means of short path distillation can prevent or reduce degradation. It is worth mentioning that true short path or molecular distillation may not be practical, due to extremely low throughput and evaporation capacity.

The MFP is defined as:

$$MFP = 1/\sqrt{2} \cdot \pi \cdot N \cdot d^2$$

where, N=number of molecules per unit volume, and d diameter of the molecules.

Prior to deodorization, undeodorized (crude) oils contain free fatty acids (FFAs). For example, crude vegetable oils generally contain 2 to 3% or more FFAs, depending on their fatty acid profiles. These FFAs in undeodorized oils impose large loads on conventional distilling equipment. Furthermore, in some cases, the crude oils contain multiple contaminants, each with its own boiling point, which makes conventional short path distillation less than optimum.

In some applications, producers prefer to separate multiple contaminants into several streams, instead of a single contaminant stream from distillation apparatus. These streams, or ones of them, generally have commercial value, particularly if each stream, such as a stream of relatively pure FFAs, is relatively free of other contaminants. In contrast, a single contaminant stream from a conventional short path stripper forces a producer to refine the contaminant stream with additional equipment and processes.

As noted, some products are heat sensitive and should, therefore, be processed at as low a temperature as possible, with residence times as short as possible. However, as noted, complex contamination schemes are often not amenable to solution with a single conventional short path distillation apparatus. In the prior art, multiple pieces of equipment may be used in series to remove a series of contaminants, at the cost of product loss, complexity, and capital expense.

As is well known in the art, distilling or stripping under partial vacuum reduces the boiling points of compounds to be separated. For example, it is generally understood that, in most cases, the boiling point of a given compound is reduced by approximately 40° C. for each order of magnitude reduction in operating pressure. Therefore, it is important to minimize the number of unit operations, because multiple unit operations and interconnecting piping between the operations generates excessive pressure drop, resulting in higher operating temperatures, and potential degradation of heat sensitive, high-boiling compounds.

Figure 1:
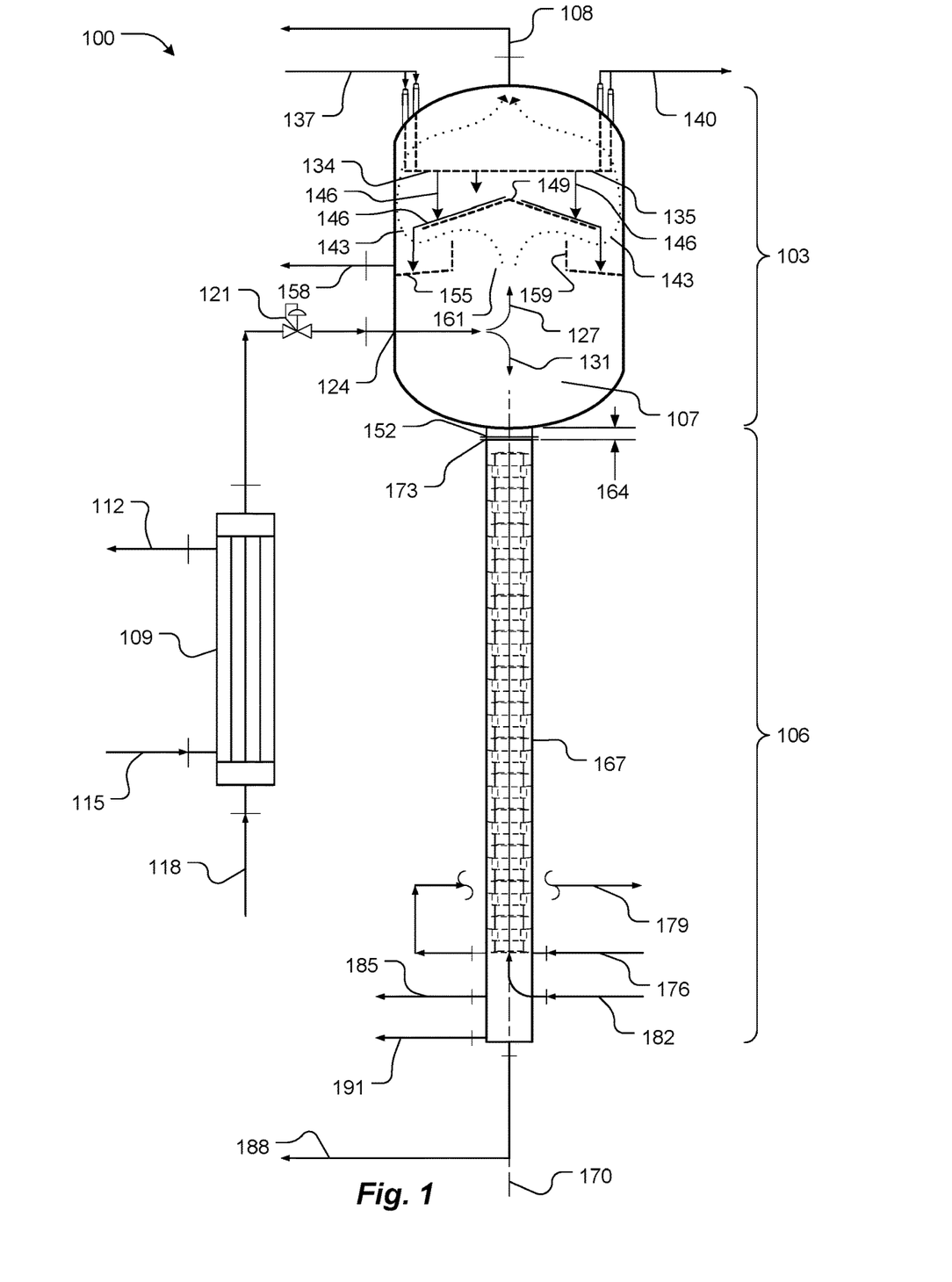
FIG. 1 is a partially schematic, partially cut-away diagram of a short path fractional distillation apparatus, according to an embodiment of the present invention.

Embodiments of the present invention solve these, and other problems associated with the prior art by providing short path fractional distillation apparatus with multiple output streams. An embodiment of the short path fractional distillation apparatus 100 includes flash distillation apparatus (FD) 103 coupled directly to a short path stripper (SPS) 106, as illustrated in FIG. 1.

The flash distillation apparatus 103 defines a fractionation volume 107. As discussed herein, the fractionation volume 107 acts as a fractionation zone. An evacuation port 108 is in fluid communication with the fractionation volume 107. In use, the evacuation port 108 is coupled to a source of vacuum to establish a suitable partial vacuum in the fractionation volume 107 and in the short path stripper 106.

A pre-heater 109 includes heating medium input and output ports 112 and 115, through which a heating medium, such as heated oil, circulates. The pre-heater 109 pre-heats an input liquid, such as a crude edible oil 118 high in free fatty acids (FFAs) and containing contaminants. The pre-heated edible oil 118 is provided under pressure, via a back-pressure valve 121, to a first input port 124 of the flash distillation apparatus 103. The first input port 124 is configured to introduce the pre-heated liquid into the fractionation volume 107 and cause flash vaporization of at least a portion of the relatively lower boiling components of the introduced pre-heated oil 118, such as the FFAs and other similar boiling undesirable fractions, to be separated from the oil before entering the SPS 106.

Operating temperature of the pre-heater 109 is selected based on physical and thermal sensitivity of a particular oil 118 to be refined. For instance, palm oil can be processed at higher temperatures compared to, for instance, coconut or other more heat-sensitive oils. The operating temperature of the pre-heater 109 may also be based at least in part on vacuum pressure of the fractionation volume 107. For example, in some cases, the crude edible oil is pre-heated to between about 100° C. and about 200° C., or up to about 300° C.

The vaporized portion is indicated at 127. Only relatively light components flash, and the remining higher-boiling portion (for example, desired edible oil and most of the contaminants) of the introduced pre-heated oil remains liquid, or vaporizes and quickly condenses back into a liquid, as indicated at 131.

The flash distillation apparatus 103 includes a condenser, schematically indicated at 134, disposed within the fractionation volume 107. Although the condenser 134 is shown as being flat and horizontal, any suitable shape, design, or orientation, such as a relatively small U-tube or coil, is acceptable. The condenser 134 defines a cooling surface (schematically illustrated at 135). The condenser 134 includes cooling fluid input and output ports 137 and 140 and a cooling fluid circuit (not shown) that extends between the cooling fluid input and output ports 137 and 140 and is in thermal contact with the cooling surface 135.

The condenser 134 is configured to cool at least a portion of the fractionation volume 107. The vaporized relatively low boiling point portion 127 (such as FFAs) of the introduced pre-heated liquid is drawn toward the evacuation port 108, as indicated by dotted arrows 143, and condenses to produce a condensate, represented by arrows 146. A cap 149 has an outer periphery and is disposed below the cooling surface 135 and above a nozzle (referred to as a first output port 152) of the flash distillation apparatus 103. In part, the cap 149 prevents the condensing condensate 146 exiting via the first output port 152. Instead, the condensate 146 runs along the top of the cap 149 and then drips from the periphery of the cap 149 into a gutter, trough, or other suitable structure 155 (collectively referred to herein as a "gutter 155") disposed below the cap 149. The gutter 155 defines a fluid collecting area disposed under, and along the length of, the periphery of the cap 149. Thus, the condensate 146 is captured by the gutter 155.

The gutter 155 is in fluid communication with a first condensate port 158, which is distinct from the evacuation port 108. The first condensate port 158 is configured to withdraw the condensate 146 as a liquid from the flash distillation apparatus 103 via the first condensate port 158. For example, the gutter 155 may be sloped, so the condensate flows under gravity along the gutter 155 and then out the first condensate port 158.

The gutter 155 may define an aperture 161 having an inner periphery such that, in a vertical projection (top view), all the outer periphery of the cap 149 lies outside the inner periphery of the gutter 155, so the gutter 155 catches dripping or precipitating condensate, and prevents the condensate 146 exiting via the first output port 152. The gutter 155 may include an upturned wall 159 disposed along the inner periphery of the gutter 155 to prevent the condensate in the gutter 155 dripping into the first output port 152.

The first output port 152 of the flash distillation apparatus 103 is distinct from the first condensate port 158 and from the evacuation port 108. The first output port 152 is disposed at a bottom of, and in fluid communication with, the fractionation volume 107. An inside surface of the bottom of the flash distillation apparatus 103 may be sloped, so any liquid flows under gravity along the inside surface toward and then into the first output port 152.

The short path stripper 106 is disposed directly below the flash distillation apparatus 103. The short path stripper 106 includes a nozzle (referred to as a second input port 173) at a top of the short path stripper 106. The first output port 152 of the flash distillation apparatus 103 may be implemented by with a flange. Similarly, the second input port 173 of the short path stripper 106 may be implemented with a flange. The two flanges may be directly coupled to each other, thereby directly fluidically coupling the first output port 152 of the flash distillation apparatus 103 to the second input port 173 of the short path stripper 106, without intermediate piping. Thus, the flash distillation apparatus 103 is referred to as being integrated with the short path stripper 106. Consequently, liquid from the fractionation volume 107 flows under gravity, through the first output port 152 of the flash distillation apparatus 103, directly into the second input port 173 of the short path stripper 106. This direct connection minimizes pressure drop.

As used herein, including in the claims, "directly" means without intervening piping, pumps, or other equipment (collectively "piping"). As used herein, including in the claims, "intermediate piping" includes a pipe more than about 6 inches (15.24 cm) long. A distance 164 between the bottom of the flash distillation apparatus 103 and a top of the short path stripper 106 is minimal, no greater than about 6 inches (15.24 cm).

The short path stripper 106 is disposed directly below the flash distillation apparatus 103. The short path stripper 106 includes an elongated vertically oriented housing 167 having a vertical axis 170. The flash distillation apparatus 103 may be coaxial with the short path stripper 106 along the vertical axis 170. As noted, the second input port 173 at a top of the short path stripper 106 is directly fluidically coupled to the first output port 152 of the flash distillation apparatus 103, without intermediate piping, such that liquid from the fractionation volume 107 flows under gravity, through the first output port 152 of the flash distillation apparatus 103, into the second input port 173 of the short path stripper 106, without flowing through any intervening piping.

The short path stripper 106 includes heating fluid input and output ports 176 and 179 and a heating fluid circuit (not visible in FIG. 1) that extends between the heating fluid input and output ports 176 and 179. The short path stripper 106 also includes cooling fluid input and output ports 182 and 185 and a cooling fluid circuit (not visible in FIG. 1) that extends between the cooling fluid input and output ports 182 and 185.

The short path stripper 106 includes a nozzle (referred to as a second output port 188), distinct from the first output port 152 and the first condensate port 158 of the flash distillation apparatus 103. The second output port 188 of the short path stripper 103 is configured to withdraw a liquid residue from a bottom of the elongated housing 167, as described in more detail herein. The short path stripper 106 also includes a second condensate port 191, distinct from the first condensate port 158 of the flash distillation apparatus 103 and the second output port 188 of the short path stripper 106. The second condensate port 191 is configured to withdraw a condensate created within the short path stripper 103.

Figure 2:
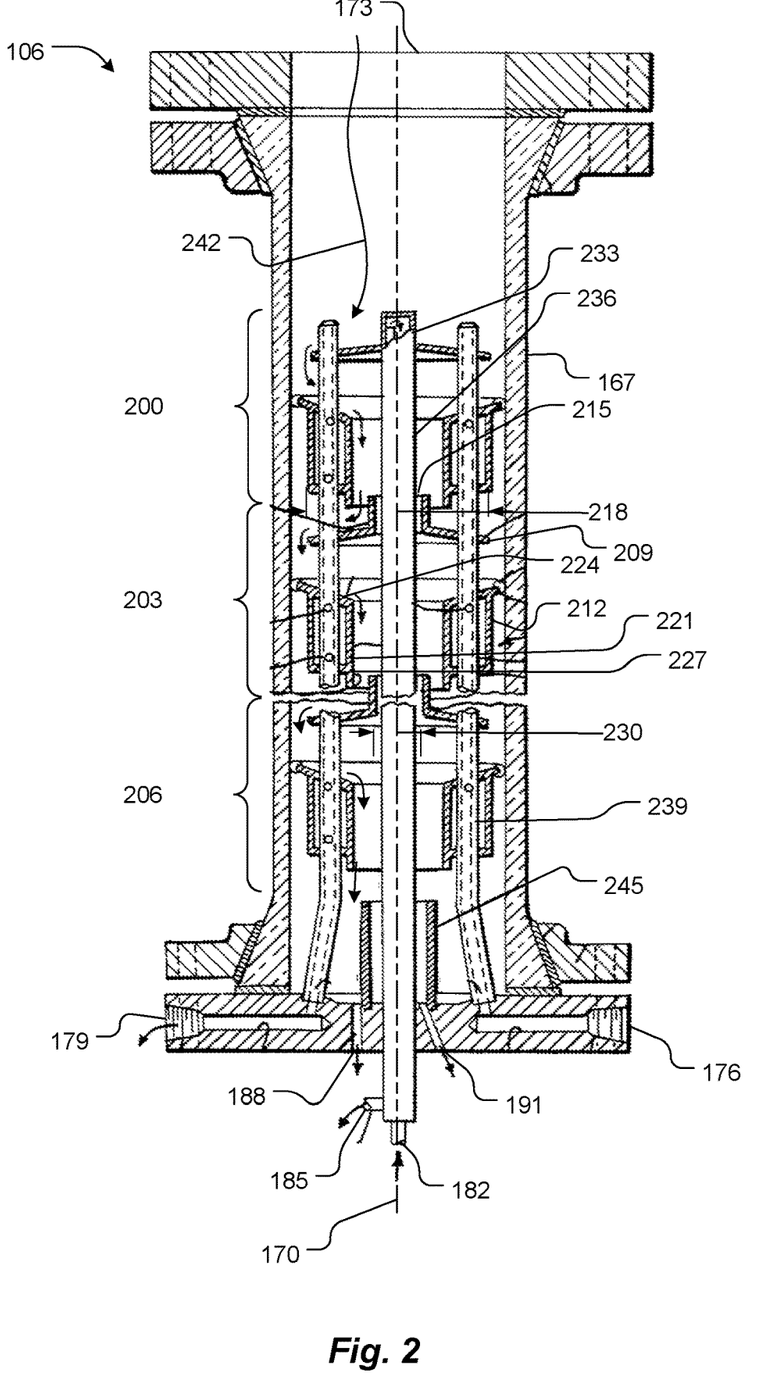
FIG. 2 cut-away diagram of a short path stripper of the short path fractional distillation apparatus of FIG. 1, according to an embodiment of the present invention.

The short path stripper 106 is shown in more detail in FIG. 2. The short path stripper 106 includes a plurality of alternating plates and jackets disposed and spaced apart along the vertical axis 170. Three sets of plates and jackets are shown at 200, 203 and 206. However, other numbers of plates and jackets may be used, depending on operating conditions, desired levels of stripping, and other considerations. An exemplary plate is indicated at 209, and an exemplary jacket is indicated at 212. Thus, a plurality of vertically spaced apart plates 209 is disposed within the housing 167, along the vertical axis 170, and a plurality of jackets 212 is interdigitated along the vertical axis 170 with the plurality of plates 209.

The plates 209 and jackets 212 are typically circular in plan view, although other shapes are acceptable. The plates 209 are oriented perpendicular to the vertical axis 170, although as shown, portions of the plates may be sloped down and away from the vertical axis 170. Each plate 209, typically except the top plate, defines a respective aperture through it, as represented by aperture 215. Each plate 209 has an outer dimension, exemplified by outer dimension 218.

Each jacket 212 includes a tube, represented by tube 221, and an inwardly and downwardly dished flange, represented by flange 224, about an upper circumference of the tube 221. Each jacket 212 is disposed below, and vertically spaced apart from, a respective above-adjacent plate 209. Each jacket 212 defines an inner wall surface, represented by wall surface 227, having an inside dimension less than the outer dimension 218 of the above-adjacent plate 209, and greater than the dimension 230 of the aperture 215 of any below-adjacent plate. As used herein, including in the claims, the term "adjacent" means the nearest (plate) or the nearest in the direction being referenced. The term "any below-adjacent plate" means if there is a plate below the jacket 212. For example, the bottom jacket 212 has no below-adjacent plate.

A cooling member 233 extends axially through the tubes of the plurality of jackets 212 and through the apertures 215 of the plates 209. The cooling member 233 has an outer wall 236 parallel to, and spaced a predetermined distance apart from, the inner wall surface 227 of each jacket 212. The cooling fluid circuit between the cooling fluid input and output ports 182 and 185 is in thermal contact with the outer wall 236. The distance between the outer wall 236 of the cooling member and the inner wall surface 227 of the jackets 212 is selected based on a desired mean free path.

A heating member 239 is thermally coupled to the inner wall surface 227 of each jacket 212, and the heating fluid circuit between the heating fluid input and output ports 176 and 179 is in thermal contact with the inner wall surface 227 of each jacket 212. Optionally, the heating member 239 is thermally coupled to the plates 209.

Thus, in operation, liquid (such as edible oil, largely free of FFAs thanks to the flash distillation apparatus 103, but still containing contaminants) from the flash distillation apparatus 103 falls under gravity into the short path stripper 106, as indicated by arrow 242. The liquid falls onto the top plate 209 and there forms a thin film that drips onto the below-adjacent jacket 215. As used herein, including in the claims, "below-adjacent" means below, and closest to.

The jacket 215 is heated by the heating element 239, and low-boiling components of the liquid film evaporate. Operating temperature of the heating element may be selected based operational requirements, such as volatility of contaminants in the product stream and vacuum pressure. For example, depending on operational requirements, a heat exchange fluid may be supplied to the heating fluid input port 176 at about 150° C. to about 300° C.

The vapor, such as from a contaminant, travels generally horizontally a short distance toward the cooling member 233, where the vapor condenses. A condensate runs down an outside surface of the cooling member and is discharged via the second condensate port 191.

The thin liquid film is reformed on each successive plate 209 and jacket 215, as the liquid cascades down the plurality of plates 209 and jackets 215. Liquid reaching the bottom of the housing 167 is discharged via the second output port 188. A collar 245 extends up from the bottom of the housing 167 and has an outside dimension smaller than the inside dimension of inner wall surface 227 of the bottom jacket 215 and, thereby, prevents mixing of the condensate running down the outside wall of the cooling element 233 with purified product dripping down from the bottom jacket 215. Thus, the short path stripper 106 includes a second condensate port 191, distinct from the first condensate port 158 and the second output port 188. The second condensate port 191 is configured to withdraw second condensate created by the cooling member 233. The second condensate port 191 and the second output port 188 are configured to prevent mixing of: (a) a liquid residue in the bottom of the elongated housing (i.e., the purified product dripping down from the bottom jacket 215) and (b) the second condensate.

Further details of construction and operation of the short path stripper 106 may be found in U.S. Pat. No. 3,393,133, titled "Short Path, Molecular Fractional Distillation Apparatus and Method Therefor," by J. L. Baird, the entire contents of which are hereby incorporated by reference herein, for all purposes.

The flash distillation apparatus 103 removes low-boiling contaminants from the input stream, thereby leaving a less contaminated stream for the short path stripper 106 to process. Thus, the combination of the flash distillation apparatus 103 and the short path stripper 106 reduces load on the short path stripper, thereby simplifying the short path stripper 106 (for example requiring fewer stages of plate and jacket than would otherwise be required) and reducing residence time of desired products within the short path stripper 106. Furthermore, the direct connection between the flash distillation apparatus 103 and the short path stripper 106 minimizes pressure drop.

Removing the bulk of the FFAs from the crude oil by the flash distillation apparatus 103 enables the short path stripper 106 to operate in the micron range of vacuum. Reducing the concentration of FFAs in the crude oil significantly reduces the liquid-vapor loading on the short path stripper 106, resulting in lower pressure drop, and therefore lower operating temperatures, which is critical to preserve quality of the oil. Reducing the concentration of FFAs prior to stripping also reduces heat- and mass-transfer demand on the short path stripper 106, resulting in lower capital and operating costs.

Furthermore, the combination of the flash distillation apparatus 103 and the short path stripper 106 provide separate condensate streams for different condensates, some of which may have commercial value, if separated from each other. A single, short path stripper would not be able to provide these separate condensate streams. For example, processed in a single short path stripper, FFAs in crude edible oils would pass all the way through the short path stripper and exit with contaminants in the condensate stream, whereas these FFAs would have commercial value, if separated from the contaminants. In general, the contaminants are less volatile than FFA and are, therefore, more difficult to separate from a product stream. Embodiments of the present invention provide at least three distinct streams: a product stream (free from FFAs and contaminants), an FFA stream, and a contaminant stream.

Embodiments of the present invention may be used to remove or prevent formation of 3-MCPDs and GEs, and remove MOSH and/or MOAH, from various edible oils.

For example, embodiments of the present invention may be used to simultaneously deodorize crude edible oil by stripping FFAs to less than about 1%, and as low as about 0.1%, or as low as about 0.01%, by weight or less. The FFAs are recovered as a by-product stream via the first condensate output port 158 and may be used for other purposes. Due to significantly lower operating temperature and pressure in the short path fractional distillation apparatus 100 (for example, about 200° C. or lower and about 0.001 to about 0.5 Torr (0.13332 to 66.66 Pa), which is lower than in a conventional deodorization), the opportunity for generating GEs and 3-MCPDs is significantly reduced.

Definitions

As used herein, the following term shall have the following meanings, unless context indicates otherwise.

"Pressure" means a force applied perpendicular to a surface of an object per unit area over which the force is distributed. A non-zero pressure that is less than an ambient pressure, or less than a pressure in a reference location such as a suction material input port, is referred to as a "partial vacuum," but is nonetheless considered to be a pressure. Partial vacuum is measured in units of pressure, typically as a subtraction relative to ambient atmospheric pressure on Earth or the pressure in the reference location. "Gauge pressure" is pressure relative to an ambient, usually atmospheric, pressure, and a negative gauge pressure indicates a partial vacuum.

Pressure or partial vacuum can be expressed using various units, such as millimeters of mercury absolute (mm Hg a), Torr, pascal, inches of mercury, inches of water, pounds per square inch (psi) or kilograms per centimeter squared (kg/cm$^2$). "Absolute vacuum" is a theoretical concept that characterizes a space completely devoid of matter. Partial vacuum measured relative to ambient, typically atmospheric, pressure is specified with a "V," as in millimeters of mercury vacuum (mm Hg v), whereas partial vacuum measured relative to absolute vacuum is specified with an "a," as in millimeters of mercury absolute (mm Hg a). As used herein, the term "vacuum" without modifier means partial vacuum.

While the invention is described through the above-described exemplary embodiments, modifications to, and variations of, the illustrated embodiments may be made without departing from the inventive concepts disclosed herein. For example, although specific parameter values, such as materials and dimensions, may be recited in relation to disclosed embodiments, within the scope of the invention, the values of all parameters may vary over wide ranges to suit different applications. Unless otherwise indicated in context or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, an element described as being configured to perform an operation "or" another operation is met by an element that is configured to perform only one of the two operations. That is, the element need not be configured to operate in one mode in which the element performs one of the operations, and in another mode in which the element performs the other operation. The element may, however, but need not, be configured to perform more than one of the operations.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module," "operation," "step" and similar terms are for convenience and not intended to limit their implementation.

Disclosed aspects, or portions thereof, may be combined in ways not listed herein and/or not explicitly claimed. In addition, embodiments disclosed herein may be suitably practiced, absent any element that is not specifically disclosed herein. Accordingly, the invention should not be viewed as being limited to the disclosed embodiments.

As used herein, numerical terms, such as "first," "second" and "third," are used to distinguish respective ports from one another and are not intended to indicate any particular order or total number of ports in any particular embodiment. Thus, for example, a given embodiment may include only a second port and a third port.

What is claimed is:

1. A short path fractional distillation apparatus comprising:
   flash distillation apparatus that defines a fractionation volume and comprises:
      an evacuation port in fluid communication with the fractionation volume;
      a first input port configured to introduce a pre-heated liquid into the fractionation volume and cause vaporization of at least a relatively low boiling point portion of the introduced pre-heated liquid;
      a condenser disposed within the fractionation volume and configured to cool at least a portion of the fractionation volume and thereby condense a vaporized relatively low boiling point portion of the introduced pre-heated liquid to produce a first condensate;
      a first condensate port, distinct from the evacuation port, configured to withdraw the first condensate; and
      a first output port, distinct from the first condensate port and distinct from the evacuation port, disposed at a bottom of, and in fluid communication with, the fractionation volume and configured to allow a liquid portion of the introduced pre-heated liquid to flow under gravity therethrough; and
   a short path stripper disposed directly below the flash distillation apparatus, the short path stripper comprising:
      an elongated housing having a vertical axis and a second input port at a top of the short path stripper, wherein the second input port is directly fluidically coupled to the first output port of the flash distillation apparatus, without intermediate piping, such that liquid from the fractionation volume flows under gravity, through the first output port, into the second input port;
      a plurality of vertically spaced apart plates disposed within the housing along the vertical axis, wherein each plate: has an outer dimension; is oriented perpendicular to the vertical axis; and defines a respective aperture therethrough, the aperture having a respective dimension;
      a plurality of jackets interdigitated along the vertical axis with the plurality of plates, wherein each jacket: comprises a tube and an inwardly and downwardly dished flange about an upper circumference of the tube; is disposed below, and vertically spaced apart from, a respective above-adjacent plate of the plurality of plates; and defines an inner wall surface having an inside dimension less than the outer dimension of the above-adjacent plate and greater than the dimension of the aperture of any below-adjacent plate;
      a cooling member that extends axially through the tubes of the plurality of jackets and has an outer wall parallel to, and spaced a predetermined distance apart from, the inner wall surface of each jacket of the plurality of jackets;
      a heating member thermally coupled to the inner wall surface of each jacket of the plurality of jackets;
      a second output port, distinct from the first output port and distinct from the first condensate port, configured to withdraw a liquid residue from a bottom of the elongated housing; and
      a second condensate port, distinct from the first condensate port and the second output port, configured to withdraw second condensate created by the cooling member.

2. The short path fractional distillation apparatus of claim 1, wherein the condenser comprises:
   a cooling surface, a first cooling fluid input port, a first cooling fluid output port, and a first cooling fluid circuit that extends from the first cooling fluid input port to the first cooling fluid output port, wherein the first cooling fluid circuit is in thermal contact with the cooling surface;
   a cap having an outer periphery and disposed below the cooling surface and above the first output port; and
   a gutter disposed below the cap; in fluid communication with the first condensate port;
   and that defines an aperture having an inner periphery such that, in a vertical projection, all of the outer periphery of the cap lies outside the inner periphery of the gutter.

3. The short path fractional distillation apparatus of claim 1, wherein the cooling member comprises a second cooling fluid input port, a second cooling fluid output port, and a second cooling fluid circuit that extends from the second cooling fluid input port to the second cooling fluid output port, wherein the second cooling fluid circuit is in thermal contact with the outer wall.

4. The short path fractional distillation apparatus of claim 1, wherein the heating member comprises a heating fluid input port, a heating fluid output port, and a heating fluid circuit that extends from the heating fluid input port to the heating fluid output port, wherein the heating fluid circuit is in thermal contact with the inner wall surface of each jacket of the plurality of jackets.

5. The short path fractional distillation apparatus of claim 1, wherein a distance between a bottom of the flash distillation apparatus and a top of the short path stripper is less than about 6 inches.

\* \* \* \* \*